United States Patent
Taylor et al.

(10) Patent No.: US 6,805,764 B2
(45) Date of Patent: Oct. 19, 2004

(54) METHOD FOR ADHESIVELY BONDING LAMINATES AND COMPOSITE STRUCTURES

(75) Inventors: J. Steve Taylor, Muscatine, IA (US); Roger E. McPherson, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 230 days.

(21) Appl. No.: 09/864,779

(22) Filed: May 24, 2001

(65) Prior Publication Data

US 2002/0017555 A1 Feb. 14, 2002

Related U.S. Application Data

(60) Provisional application No. 60/216,083, filed on Jul. 6, 2000.

(51) Int. Cl.[7] .................. D04H 3/12; C09J 5/00
(52) U.S. Cl. .................. 156/181; 156/324; 156/325; 156/326; 442/149; 442/180; 442/374; 428/364; 428/375; 428/396
(58) Field of Search .................. 156/181, 324, 156/325, 326; 442/149, 150, 151, 153, 164, 168, 172, 180, 179, 239, 242, 251, 277, 218, 219, 220, 226, 227, 374, 375, 381; 428/364, 365, 375, 396; 106/163.01, 164.01, 164.03, 136.1, 137.1; 536/56, 102, 128; 162/132, 96, 202, 184; 493/329, 331, 332

(56) References Cited

U.S. PATENT DOCUMENTS

| | | | |
|---|---|---|---|
| 2,019,056 A | * | 10/1935 | Osgood et al. ............ 428/420 |
| 2,801,955 A | | 8/1957 | Rutenberg et al. |
| 2,868,778 A | | 1/1959 | Watson et al. |
| 3,716,526 A | | 2/1973 | Schweiger |
| 4,038,481 A | | 7/1977 | Antrim et al. |
| 4,071,651 A | * | 1/1978 | Hicklin et al. ............ 442/103 |
| 4,075,028 A | * | 2/1978 | Amosov et al. ......... 106/164.3 |
| 4,514,532 A | * | 4/1985 | Hsu et al. .................... 524/14 |
| 4,587,285 A | * | 5/1986 | Ayla et al. .................... 524/78 |
| 4,942,191 A | * | 7/1990 | Rogers ........................ 524/17 |
| 5,503,668 A | | 4/1996 | Giesfeldt et al. |
| 5,855,659 A | | 1/1999 | Giesfeldt et al. |
| 5,972,091 A | | 10/1999 | Giesfeldt et al. |
| 6,063,178 A | | 5/2000 | McPherson et al. |
| 6,179,905 B1 | | 1/2001 | McPherson et al. |

FOREIGN PATENT DOCUMENTS

WO    WO 98/40413 A1    9/1998

* cited by examiner

Primary Examiner—Jeff H. Aftergut
Assistant Examiner—Jessica Rossi
(74) Attorney, Agent, or Firm—Banner & Witcoff, Ltd.

(57) ABSTRACT

Disclosed are composite structures prepared using a hemicellulose-based adhesive. In a preferred embodiment, a laminate composed of plural laminae which have been bonded to one another using a hemicellulose-based adhesive is provided. The laminate is useful as a separator or partition in a shipping vessel. Most preferably, the hemicellulose-based adhesive contains one or more bonding agents and water., the hemicellulose being present in an amount of at least 10% by dry basis weight of the bonding agents.

31 Claims, 1 Drawing Sheet

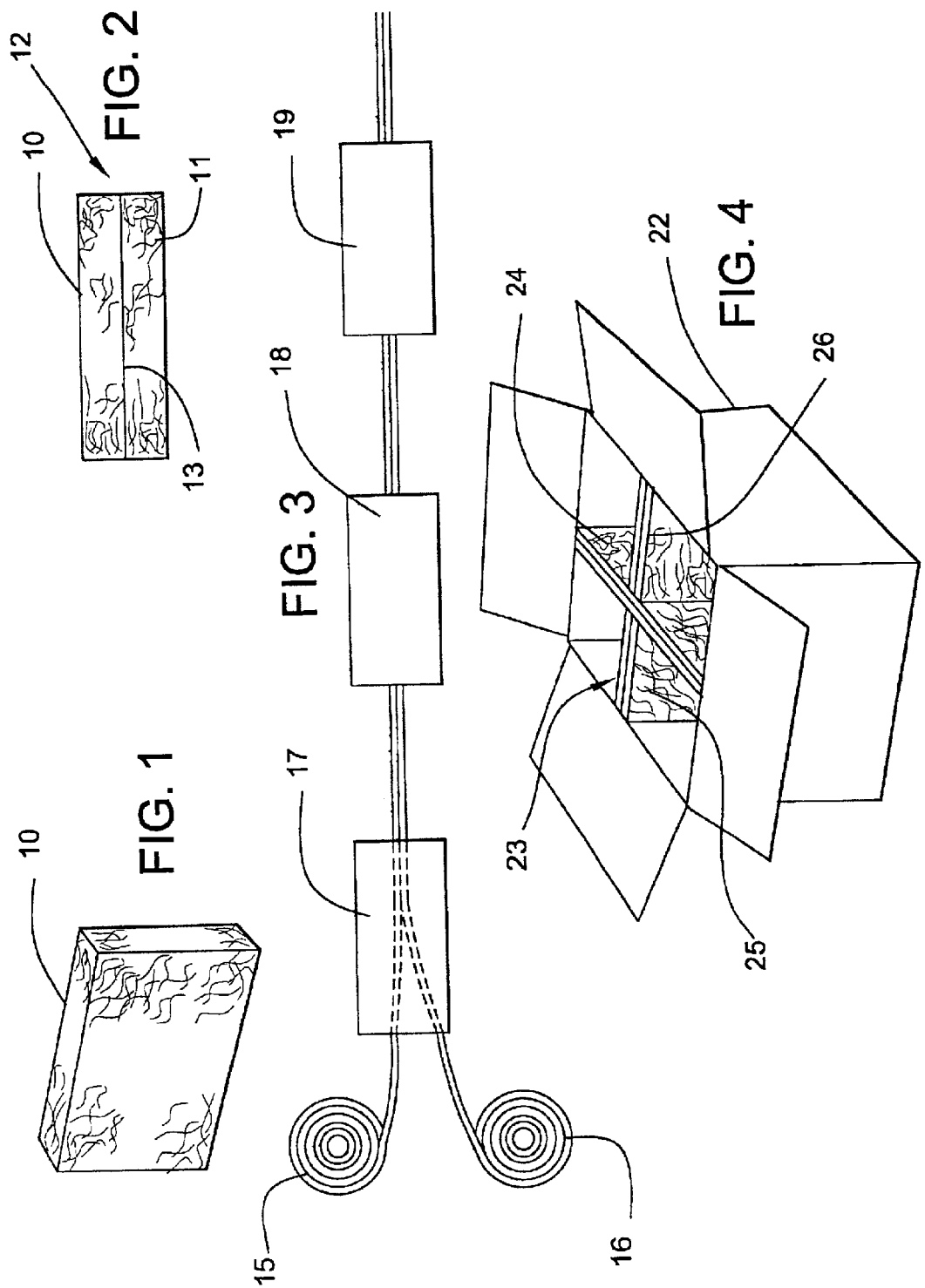

METHOD FOR ADHESIVELY BONDING LAMINATES AND COMPOSITE STRUCTURES

CROSS-REFERENCE TO RELATED PATENT APPLICATIONS

This application claims the benefit of U.S. Provisional Patent application No. 60/216,083, filed Jul. 6, 2000.

TECHNICAL FIELD OF THE INVENTION

This invention pertains to adhesive compositions and to composite structures prepared therefrom. In a preferred embodiment, the invention is directed towards a partition for a shipping vessel. The partition is composed of an adhesively bonded composite structure, which preferably is a laminar structure composed of two or more laminae.

BACKGROUND OF THE INVENTION

Shipping containers and vessels, such as corrugated paper boxes, often require separator boards or partitions to separate the contents of the shipping vessel during transportation in order to protect against damage. Such partitions must be stiff and light in weight in order to provide maximum content protection and in order to minimize packaging cost and shipping weight. Typical separator boards in current use are made from paper products, such as linerboard, a heavy product made from cellulose fibers. Often, the separator boards are made as laminates of these linerboards, the plys of the laminates being held together with one of any number of adhesives currently known to bond cellusosic material together. Typical adhesives used in the construction of linerboard include, for instance, cooked starch, urea-formaldehyde resins, and melamine-formaldehyde resins. The combination of these single and multiple ply separator boards often is a significant portion of the weight of the shipping vessel and may increase shipping costs. In addition, the cost of the partition can contribute to the cost of the final packaged product owing to freight costs in transport of the separator boards from the separator board manufacturer to the shipper.

It has also been proposed to use a partition composed of fiberglass or a like composite material. Fiberglass may be prepared from a nonwoven mat of a fibrous material, typically glass strands or filaments, by impregnating the mat with a thermosetting resin. It has further been proposed to use an adhesive to bind a nonwoven mat of fibers to thereby form a composite structure. A composite structure thus prepared is lightweight and stiff and may be used as a shipping vessel partition, or may be used in the preparation of a laminate. In addition, adhesively bonded laminates are known. In one known process for preparing such a laminate, two mats composed of a nonwoven material are immersed in a bath of an adhesive composition and pressed together. The structure thus prepared is heated to dewater the adhesive composition to thereby form a composite laminate. Through the foregoing process, laminates that have a stiffness that is satisfactory for use in shipping applications can be prepared.

Heretofore, starch-based adhesives have been used to prepare composite structures such as laminates. It has been found that such starch-based adhesives are unsatisfactory in many respects. The composite structure prepared using starch-based adhesives, though lightweight, still are of higher density than ordinarily is desired. In addition, the stiffness of the known composite materials is somewhat unsatisfactory, thus making such materials somewhat unsuitable for use as partitions in shipping vessels.

In light of the foregoing, it is a general object of the invention to provide, in preferred embodiments, a composite material having improved density and stiffness as compared to the known materials heretofore described. More generally, it is an object to provide a method for adhesive bonding, the method being useful in the preparation of composite structures as heretofore discussed.

THE INVENTION

Surprisingly, it has been found that a hemicellulose-based adhesive can be used in the preparation of composite structures and for other bonding purposes. Hemicellulose is a soluble component of agricultural residue such a corn hulls and other cellulose-containing materials. Hemicellulose is readily obtainable via the alkaline cooking of corn hulls, as is taught in U.S. Pat. Nos. 2,801,955; 3,716,526; 2,868,778; and 4,038,481, and in published International Application No. WO 98US/05551. The alkaline cooking of corn hulls to produce an adhesive composition for cellulosic materials also is known in the art, as is taught in U.S. Pat. Nos. 6,063,178; 5,855,659; and 5,503,668. Additionally, the alkaline cooking of spent corn germ to provide an adhesive composition for cellulosic materials is known in the art, as is taught in U.S. Pat. No. 5,972,091.

In accordance with the invention, a hemicellulose-containing material, such as the liquid fraction from an alkaline-cooked agricultural residue, is used to fabricate a composite structure, such as a laminate. A composite structure thus prepared may be used as a partition in a shipping vessel. As set forth in more detail hereinbelow, the density and stiffness of such structure are improved over those of known composite structures fashioned with starch-based adhesives.

In accordance with a preferred embodiment of the invention, a liquid-pregnable material is impregnated with a hemicellulose-based adhesive composition. The adhesive composition is at least substantially dewatered, such as by applying heat, to thereby form a composite structure. Most preferably, the liquid-pregnable material is one ply (laminae) of a laminar structure, i.e., a laminate. The laminate may be prepared by providing a laminar structure that includes two laminae that are in contact with one another, at least one of the laminae being a liquid-pregnable material that is impregnated with a hemicellulose-containing liquid adhesive composition. Upon dewatering of the adhesive composition, a laminate is provided. Most preferably, the laminate is prepared by providing two laminae, each of which is composed of a nonwoven mat of a fibrous material. Before or after the laminae are placed into contact with one another, but preferably before, the laminae are together impregnated with an adhesive composition. The adhesive composition then is at least substantially dewatered to yield a laminate.

Features of the preferred embodiments of the invention are set forth hereinbelow.

BRIEF DESCRIPTION OF THE DRAWINGS

FIG. 1 is a perspective view of a prepreg prepared in accordance with the invention.

FIG. 2 is a perspective view of a composite structure prepared in accordance with the invention prior to dewatering.

FIG. 3 is an representation of a continuous process for preparing laminates in accordance with the invention.

FIG. 4 is a perspective view of a shipping vessel that includes a partition, the partition being composed of a laminate prepared in accordance with the invention.

DESCRIPTION OF THE PREFERRED EMBODIMENTS

The adhesive composition used in connection with the invention includes hemicellulose and water. Generally, the adhesive composition includes hemicellulose, which preferably comprises or is obtained from the liquid fraction resulting from alkaline cooking of a hemicellulose-containing agricultural residue. Most preferably, the residue is a corn hull residue. Hemicellulose preferably is obtained from corn hulls, a by product from the corn wet milling industry. Hemicellulose also can be obtained from corn bran, a by product from the corn dry milling industry; from spent germ, also from the corn wet milling industry; or from spent germ from the corn dry milling industry. All of these products are byproducts, either from the isolation of corn starch, corn protein and corn oil in the case of the corn wet milling industry, or from the isolation of corn flour and corn oil in the case of the corn dry milling industry. These byproducts are of little economic value per se, being marketed mainly as excipients within animal feeds. American agriculture and the corn wet milling industry and the corn dry milling industry together provide a reliable, low cost, and consistent source of hulls, bran, and spent germ through their mass production of corn and the conversion of corn into the products starch, corn flour, protein, and oil, and the byproducts, hulls, bran, and spent germ. Because of the high hemicellulose content and ready availability of corn hulls, corn hulls are the preferred hemicellulose source. An example of an accepted composition of commercially produced corn hulls or corn bran is as follows: hemicellulose-56.38%, cellulose-18.79%, starch-8.14%, protein-7.90%, fat-1.69%, acetic acid-3.51%, ferulic acid-2.67%, diferulic acid-0.58%, coumaric acid-0.33%, and trace amounts of other materials such as phytosytosterols and minerals. The materials are chemically and physically bound together in the corn hulls. Other suitable sources for hemicellulose include other seed sources, such as wheat, oats, and soybeans.

The hemicellulose may be present in the adhesive composition in any amount effective to provide bonding in connection with the intended use of the adhesive. The hemicellulose may be the sole or primary bonding agent in the adhesive composition, but it is contemplated that other bonding agents further may be present. Preferably, the hemicellulose is present in an amount of at least 10% by dry weight of the bonding agent in the adhesive composition. Most preferably, the hemicellulose is present in an amount of at least 45% or at least 50% by dry weight of the bonding agent in the adhesive composition. In some embodiments, the hemicellulose constitutes essentially 100% of the bonding agent. The remainder of the bonding agents, if any, in the adhesive composition may be starch-based.

Generally, the adhesive may be used to bond two substrates together, one or both of which substrates may be a liquid pregnable material. The adhesive further may be used to impregnate a single laminae or ply of a liquid pregnable material. The impregnated material thus prepared may be dewatered for use in applications such as shipping partitions, or may be used as a pre-impregnated laminae or "prepreg" in further processing. When the adhesive is used to bond two substrates to one another, the substrates may be glass, metal, fibrous material, paper, fabrics, cardboard, wood, or, more generally, any materials susceptible to bonding. Each substrate may or may not be of a like material.

The manner of applying the adhesive may be conventional, and, for instance, may be accomplished by contacting a surface of one or both substrates with an effective amount of the adhesive to accomplish bonding of the two substrates. Preferably, the substrate is immersed in a bath of the adhesive composition. Subsequently, the first and second substrate are placed into contact at least along the coated surface, thereby forming a bonding interface. By "in contact" is contemplated not only direct contact of the substrates but also contact via an intermediate adhesive connection. After the substrates have been placed into contact, the adhesive composition then is at least substantially dewatered, by which is contemplated removing sufficient water to effectuate an adhesive bond between the substrates. The substrates may be dewatered by applying heat. It is contemplated that not all of the water found in the adhesive composition may need to be removed in order to create a bond between the substrates.

The adhesive composition can be used to prepare a composite structure by impregnating a liquid pregnable material with the adhesive composition. By "liquid pregnable" is contemplated a material that is pregnable with the liquid adhesive beyond the surface parameter of the material. Most preferably, the liquid pregnable material is either a nonwoven mat of fibers, such as glass fibers, aramid fibers, cellulose fibers, cotton fibers, wool fibers, rayon, polyester, and the like, or is a woven fabric of such fibers. For instance, the adhesive may be used in the preparation of a laminate. The laminate is contemplated to include any structure prepared from two or more laminae, which may or may not be of comparable size and shape and which may or may not be flat and regular in construction, although for a material intended for use as a partition in a shipping vessel, a flat, regular structure is preferred. The laminate may include two, three, four, or more laminae, each of which may be of various shapes or sizes. Preferably, but not necessarily, all of the laminae are liquid pregnable.

Various manufacturing methods comparable to those conventionally used to prepare fiberglass may be used in the preparation of composite structures using the adhesive composition of the invention. For instance, as shown in FIG. 1, a prepreg 10 may be prepared by impregnating a mat of fibers with the hemicellulose-containing liquid adhesive composition. The mat should be impregnated with at least sufficient adhesive such that the stiffness of the pregnable material is increased upon dewatering of the adhesive. Stiffness, or resistance to bending, may be evaluated via any suitable test; one such test is disclosed in TAPPI T-489 om-92. Generally, sufficient adhesive should be added to the mats such that the adhesive comprises from about 10%–90% of the weight of the dried composite. The prepreg may be used alone to prepare a composite structure, by dewatering the prepreg. Before or after dewatering, the prepreg may be cut into a suitable size for use as a partition in a shipping vessel.

More preferably, as shown in FIG. 2, the prepreg 10 is brought into contact with a second prepreg 11 to form a laminar structure 12 at a bonding interface 13. The laminar structure 12 may be at least substantially dewatered to form a laminate. When the laminae are composed of nonwoven fibrous mats, it is contemplated that dewatering may occur upon heating by escape of water vapor from all surfaces of the laminar structure. When a laminar structure is to be created, the mat should be impregnated with a sufficient amount of adhesive to create an adhesive bond sufficient to retain the laminate structure of the composite material form a laminate upon dewatering of the adhesive.

As shown in FIG. 3, a preferred method for manufacturing a two-ply laminate is performed by providing rolls 15, 16 of material to be used as laminae. At least one of the materials, and preferably both of the materials, are liquid pregnable; most preferably, each roll of material is composed of a nonwoven mat of fibers. In this embodiment, the mats 15, 16 are introduced to a bath 17 of adhesive composition, whereby the mats are impregnated with the adhesive composition. Those skilled in the art will appreciate that various processing speeds and other conditions may be employed to add sufficient adhesive to the mat. Subsequently, the laminae, which are in contact with one another, optionally are passed through a former 18 to alter the shape of the laminar structure, and then are passed through a dryer 19. The laminar structure should spend sufficient time in the drier to at least substantially dewater the adhesive composition. Again, it will be appreciated by those skilled in the art that various drying time and temperatures and various processing speeds may be employed. Upon exiting the dryer 19, a laminate is provided. The laminate then is cut to the appropriate size (step not shown) and may be used as a partition in a shipping container or vessel.

As shown in FIG. 4, a typical shipping vessel 22 may be a cardboard box, although it is contemplated that the partition prepared in accordance with the invention may be used in numerous other shipping vessels or containers. A partition 23, which is composed of the laminate prepared as heretofore discussed, is provided in the shipping vessel and divides the interior volume of the vessel into subvolumes (in the illustrated embodiment, the interior volume of a shipping vessel is divided into four subvolumes). As shown, the partition is composed of a first strip 24 of laminate to which second and third strips 25, 26 have been adhesively or otherwise secured. The partition need not take the particular shape shown in the drawings, and indeed to the contrary it is contemplated that the design of the partition may range from the very simple (such as a single strip of laminate) to a much more complicated construction. In preferred embodiments, the laminates are used to separate horizontal layers of products being packaged. It is preferred to avoid cutting the laminates in the preparation of partitions and other structures so as to avoid potentially adverse health and environmental consequences of fiber "dust" generated upon cutting.

The adhesive composition of the invention may be used in other methods for preparing laminates. For instance, the first and second laminae may be placed into contact before or after impregnating the laminates with the adhesive composition, or contemporaneously therewith. In such case, one or both of the laminae may be provided in prepreg form. In an alternative embodiment, a "sandwich" structure that comprises two nonwoven mats surrounding a core of material, such as paper, wood, or other material, may be prepared. For instance, the adhesive laminate may be a laminate of fabric strips, which may be used as construction materials in furniture or for other purposes.

The following examples further illustrate the invention, but should not be construed as limiting the scope of the invention.

EXAMPLE 1

Preparation of Adhesive Composition

Seven hundred fifty g dry basis finely ground corn hulls containing 51.3 g water was added to sufficient water to give a total weight of 8333 g. The pH of the stirred slurry was adjusted to 7.0 with $Ca(OH)_2$, and then 50 g $Ca(OH)_2$ was added. The resulting slurry was continuously jet-cooked at a rate of 0.185 gallons per minute using high pressure steam. The conditions of the jet cook were: Temperature=~305° F., Pressure=~70 p.s.i.g., Retention Time=~14.1 minutes.

EXAMPLE 2

Preparation of Adhesive Composition

Two hundred g dry basis finely ground corn hulls was added to sufficient water to give a total weight of 2000 g. The pH of the stirred slurry was adjusted to 7.0 with $Ca(OH)_2$, and then 14.23 g $Ca(OH)_2$ was added. The resulting slurry was batch cooked with stirring at atmospheric pressure at 212° F. for two hours. The resulting adhesive had satisfactory properties.

EXAMPLE 3

Preparation of Adhesive Composition

Corn hulls from a corn wet-milling process were extrusion cooked with NaOH in a Wenger TX-57 Twin Screw Extruder according to the following conditions:

Extruder speed=208 rpm

Feed Rate=145 pounds per hour

50% NaOH=216 milliliters per minute

Steam=4 pounds per hour

Water=15 pounds per hour

Barrel #1 Temperature=111° F.

Barrel #2 Temperature=240° F.

Barrel #3 Temperature=332° F.

Barrel #4 Temperature=332° F.

Barrel #5 Temperature=270° F.

The extruded product was dried in a moving grate drier and ground into a coarse powder. The resulting coarsely ground dried extrudate was formulated into an adhesive paste by mixing 15 parts by weight coarsely ground extruder product with 85 parts water.

EXAMPLE 4

Preparation of Adhesive Composition

Five hundred g dry basis corn hulls containing 766 g water was added to sufficient water to give a total weight of 5000 g. The stirred slurry was heated and maintained at 82° C. to 96° C. for two hours. The hot slurry was then filtered through a No. 60 Mesh A.S.T.M.E. Standard Testing Sieve. The retained solids were subjected to a second treatment of slurrying, stewing, and filtering, and then to a third treatment of slurrying, stewing, and filtering. The retained solids were crumbled, placed on screens, and allowed to air-dry at room temperature.

One hundred g dry basis of the treated corn hulls thus obtained were added to a solution already containing 1610 mL 190 proof ethanol, 390 mL water, and 20 g 50% NaOH in a reaction flask equipped with a reflux condenser and mechanical stirring. The stirred reaction mixture was heated to the reflux temperature and then refluxed for three hours at the reflux temperature of 78° C. The reaction mixture was cooled to 40° C., and then it was vacuum filtered across a 40–60° C. fritted glass funnel. The retained solids were returned to the reaction flask and reslurried in a solution already containing 1610 mL 190 proof ethanol and 390 mL water. The slurry was heated to reflux temperature and then refluxed for one hour at the reflux temperature of 78° C. The reaction mixture was cooled to 20° C., and then it was vacuum filtered across a 40–60° C. fritted glass funnel. The retained solids were reslurried in a solution already containing 1610 mL 190 proof ethanol and 390 mL water at 20° C. and then the pH of the slurry was adjusted to 6.5 with 5.8N hydrochloiric acid. The slurry was then vacuum filtered across a 40–60° C. fritted glass funnel.

The retained solids were reslurried in 2000 mL water in a reaction flask equipped with a reflux condenser and mechanical stirring. The stirred mixture was heated to the reflux temperature and then refluxed for two hours at the reflux temperature of 98° C. The mixture was cooled to 50° C., and then was vacuum filtered across a 40–60° C. fritted glass funnel. The filtrate, referred to as FILTRATE A, which contained corn hull hemicellulose, was retained. The retained solids were reslurried in 2000 mL water in a reaction flask equipped with a reflux condenser and mechanical stirring. The stirred mixture was heated to the reflux temperature and then refluxed for two hours at the reflux temperature of 98° C.

The mixture was cooled to 50° C., and then it was vacuum filtered across a 40–60° C. fritted glass funnel. The filtrate, referred to as FILTRATE B, containing the corn hull hemicellulose, was retained. The retained solids were reslurried in 2000 mL water in a reaction flask equipped with a reflux condenser and mechanical stirring. The stirred mixture was heated to the reflux temperature and then refluxed for two hours at the reflux temperature of 98° C. The mixture was cooled to 50° C., and then it was vacuum filtered across a 40–60° C. fritted glass funnel. The filtrate, referred to as FILTRATE C, containing the corn hull hemicellulose was retained. The combined FILTRATES A, B, and C containing the corn hull hemicellulose were assayed to contain 54.5 g solids. Combined filtrates A, B, and C then were spray dried.

The resulting hemicellulose was formulated into an adhesive paste by mixing 15 parts weight hemicellulose of the spray-dried hemicellulose with 85 parts water.

EXAMPLE 5

Preparation of Adhesive Composition

Five hundred g dry basis corn hulls containing 766 g water was added to sufficient water to give a total weight of 5000 g. The stirred slurry was heated and maintained at 82° C. to 96° C. for two hours. The hot slurry was then filtered through a No. 60 Mesh A.S.T.M.E. Standard Testing Sieve. The retained solids were subjected to a second treatment of slurrying, stewing, and filtering. The retained solids from the second treatment were subjected to a third treatment of slurrying, stewing, and filtering. The retained solids were crumbled, placed on screens, and allowed to air-dry at room temperature.

One hundred g dry basis of the treated corn hulls were added to a solution already containing 1610 mL 190 proof ethanol, 390 mL water, and 20 g 50% NaOH in a reaction flask equipped with a reflux condenser and mechanical stirring. The stirred reaction mixture was heated to the reflux temperature and then refluxed for three hours at the reflux temperature of 78° C. The reaction mixture was cooled to 40° C., and then it was vacuum filtered across a 40–60° C. fritted glass funnel. The retained solids were returned to the reaction flask and reslurried in a solution already containing 1610 mL 190 proof ethanol and 390 mL water. The slurry was heated to reflux temperature and then refluxed for one hour at the reflux temperature of 78° C. The reaction mixture was cooled to 20° C., and then it was vacuum filtered across a 40–60° C. fritted glass funnel. The retained solids were reslurried in a solution already containing 1610 mL 190 proof ethanol and 390 mL water at 20° C., and then the pH of the slurry was adjusted to 6.5 with 5.8 N hydrochloric acid. The slurry was then vacuum filtered across a 40–60° C. fritted glass funnel. The retained solids were dried in an oven at 100° C.

The resulting dried solids comprised a mixture of hemicellulose and cellulose. This mixture, known as holocellulose, was were formulated into an adhesive paste by mixing 15 parts by weight solids with 85 parts water.

EXAMPLE 6

Preparation of Laminates

Several three ply laminates of fiberglass sheets measuring 3.8 cm×13.4 cm were made with sheets of nonwoven fiberglass mats that were bonded together by impregnating the sheets with the adhesive composition described in Example 1. The treated sheets were then pressed together and dried in an oven at 212° F.

Different loadings of adhesive composition on the fiberglass were achieved by immersing the individual plies in an excess of adhesive and then employing a doctor set at various clearances to doctor off the excess.

EXAMPLE 7

Analysis of Laminates

The laminated boards prepared in Example 6 were tested for percent bonding agent by weighing the three sheets of fiberglass prior to treatment with the bonding agent and weighing laminated board after drying, the difference in weight being the mass of bonding agent. Basis weight was calculated as grams per square centimeter. The boards then were tested for stiffness by measuring on a TABER V-5 Stiffness Tester using a 2000 unit counter weight and reading the stiffness at 7.5% deflection in TABER stiffness units. In addition, the boards were tested for caliper in inches by using a manual AMES 27 Thickness Gauge. The following results were obtained (percent bonding agent is expressed as percent of the total laminated board by weight):

| % Adhesive | Basis Weight (g/cm$^2$) | Stiffness (TABER Stiffness Units) | Caliper (Inch) |
| --- | --- | --- | --- |
| 28.7 | 0.0391 | 1420 | 0.085 |
| 29.7 | 0.0384 | 1360 | 0.081 |
| 30.0 | 0.0388 | 1440 | 0.087 |
| 30.2 | 0.0375 | 1500 | 0.079 |
| 34.0 | 0.0428 | 1540 | 0.085 |
| 35.0 | 0.0423 | 1480 | 0.080 |
| 35.3 | 0.0406 | 1620 | 0.084 |
| 38.0 | 0.0409 | 1590 | 0.080 |
| 42.8 | 0.0465 | 1730 | 0.086 |

Comparative Example 1

Preparation of Adhesive Composition from Corn Starch

One hundred eighty grams of C68F, a flash-acid modified starch from Grain Processing Corporation, Muscatine, Iowa, and 1.8 grams of dry soap flakes were slurried in 618.2 g tap water, and cooked at atmospheric conditions for 20 minutes at 200° F. The resulting paste was cooled to 80° F.

Comparative Example 2

Preparation of Laminates

Three-ply fiberglass laminates were prepared as in Example 6, except that the adhesive of Comparative Example 1 was employed.

Comparative Example 3

Analysis of Laminates of Comparative Example 2

The laminated boards prepared in Comparative Example 2 were tested as described in Example 7, yielding the following results:

| % Adhesives | Basis Weight ($g/cm^2$) | Stiffness (TABER Stiffness Units) | Caliper (Inch) |
|---|---|---|---|
| 46.8 | 0.0539 | 1340 | 0.082 |
| 51.4 | 0.0594 | 1280 | 0.080 |
| 50.2 | 0.0559 | 1410 | 0.078 |

From a comparison of these data with those of Example 7, it is seen that the stiffnesses of the boards of Example 6 were superior to those of Comparative Example 2, while the basis weights of the boards of Example 6 were significantly and desirably better than those of Comparative Example 2.

Comparative Example 4

A sample of laminated linerboard, obtained from National Converting and Fulfillment Corporation, Ennis, TX, was evaluated for stiffness and basis weight. Stiffness was measured to 880 TABER Stiffness Units (cross machine direction) and 1950 Stiffness Units (machine direction). The basis weight of this laminated linerboard was measured and found to be 0.087 $g/cm^2$.

EXAMPLE 9

Preparation of Pine Board Laminates

The adhesive compositions of Examples 3, 4 and 5 were used to prepare pine board laminates. Southern pine was sawed into right triangle wedges measuring height=3.0 inches (with the grain), base=1 inch (across the grain), and thickness=0.75 inch. A pair of the wooden triangles was weighed. Adhesive was placed at the center of the hypotenuse face of one of a pair of triangles, the hypotenuse face of the other triangle was brought into contact with the glue-wetted hypotenuse of the first triangle so that 0.75 inch of each hypotenuse was not covered. Total overlap was 2.375 inches. The triangles were squeezed together, and excess adhesive was wiped away. Reweighing the glued together triangles and subtracting the original weight determined the mass of adhesive trapped at the interface. The glued together triangles were dried in an oven at 100° C. overnight.

EXAMPLE 10

Analysis of Laminated Pine Boards Prepared in Example 9

The glued together boards were separated on an Instron Universal Tester by pushing down on the upper triangle of the glued together pair in order to determine the relative strengths of the adhesives.

The following table shows the results of separating the laminated pine boards. The data convey that the adhesives can be used to bind wood to wood. It is further seen that the higher the purity of the hemicellulose in the adhesive, the stronger the cured adhesive bond.

| Adhesive Composition | Amount of adhesive | Delamination Force |
|---|---|---|
| EXAMPLE 3 | 0.37 grams | ~2 pounds |
| EXAMPLE 4 | 0.35 grams | >90 pounds |
| EXAMPLE 5 | 0.39 grams | ~30 pounds |

EXAMPLE 11

Preparation of Laminated Fabric Strips

The adhesive composition of Examples 3, 4 and 5 were used to prepare laminated fabric strips. Fabric was cut into strips one inch wide and four inches long. A pair of the strips was selected. Adhesive was placed at the center of one of the strips, the other strip was brought into contact with the glue-wetted surface of the first strip so that 2.00 inches of each strip was not covered. Total overlap was 2.0 inches. The "sandwiches" were allowed to dry overnight at room temperature.

EXAMPLE 12

Analysis of Laminated Fabric Strips Prepared in Example 11

The glued together fabric strips were separated on an Instron Universal Tester equipped with grasping clamps in order to determine the relative strengths of the adhesives.

The following table shows the results of pulling apart the laminated fabric strips. The data convey that the higher the purity of the hemicellulose in the adhesive, the stronger the cured adhesive bond.

| Adhesive | Type of fabric | Delamination Force |
|---|---|---|
| EXAMPLE 3 | Fine polyester | ~14 pounds |
| EXAMPLE 3 | Coarse nylon | ~15 pounds |
| EXAMPLE 4 | Fine polyester | ~25 pounds |
| EXAMPLE 4 | Coarse nylon | ~21 pounds |
| EXAMPLE 5 | Fine polyester | ~13 pounds |
| EXAMPLE 5 | Coarse nylon | ~21 pounds |

It is thus seen that the invention provides a composite structure that is suitable for use as a partition in a shipping vessel.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the claims. All of the references cited herein, and the prior provisional application referenced hereinabove, are hereby incorporated in their entireties by reference.

What is claimed is:

1. A method for preparing a laminate, comprising the steps of providing a first laminae and a second laminae, at least said first laminae being liquid pregnable and being impregnated with a liquid adhesive composition said first laminae being in contact with said second laminae along a bonding interface; and at least substantially dewatering said adhesive to thereby form an adhesive bond between said first and second laminae at said bonding interface, said first laminae comprising a non-woven mat of fibers, said adhesive composition consisting essentially of hemicellulose and water.

2. A method according to claim 1, said fibers comprising glass fibers.

3. A method according to claim 1, wherein said adhesive composition comprises a liquid fraction derived from an alkaline cooked hemicellulose-containing agricultural residue.

4. A method according to claim 1, said dewatering step including applying heat.

5. A method according to claim 1, including the step of providing said first laminae in prepreg form.

6. A method according to claim 5, including the step of providing said second laminae in prepreg form.

7. A method according to claim 1, including the step of placing said first and second laminae into contact along said bonding interface prior to impregnating said first laminae with said adhesive composition.

8. A method according to claim 7, said second laminae being liquid pregnable, said method including the step of impregnating said first and second laminae with said adhesive composition after placing said first and second laminae into contact along said bonding interface.

9. A method according to claim 1, including the steps of impregnating said first laminae with said adhesive, and subsequently placing said first laminae into contact with said second laminae.

10. A method according to claim 9, further including the step of impregnating said second laminae with said adhesive.

11. A method according to claim 10, wherein said second laminae is impregnated prior to placing said second laminae into contact with said first laminae.

12. A method for preparing a prepreg, comprising the steps of providing a liquid pregnable substrate; and impregnating said substrate with an adhesive composition, said adhesive composition consisting essentially of hemicellulose and water, said substrate comprising a non-woven mat of fibers, said hemicellulose comprising corn hull hemicellulose.

13. A method according to claim 12, said fibers comprising glass fibers.

14. A method according to claim 12, wherein said adhesive composition comprises a liquid fraction derived from an alkaline cooked hemicellulose-containing agricultural residue.

15. A method for preparing a laminate, comprising the steps of providing a first laminae and a second laminae, at least said first laminae being liquid pregnable and being impregnated with a liquid adhesive composition, said adhesive composition consisting essentially of hemicellulose and water, said first laminae being in contact with said second laminae along a bonding interface; and at least substantially dewatering said adhesive to thereby form an adhesive bond between said first and second laminae at said bonding interface, said first laminae comprising a non-woven mat of fibers, said hemicellulose comprising corn hull hemicellulose.

16. A method according to claim 15, said fibers comprising glass fibers.

17. A method according to claim 15, said dewatering step including applying heat.

18. A method according to claim 15, including the step of providing said first laminae in prepreg form.

19. A method according to claim 18, including the step of providing said second laminae in prepreg form.

20. A method according to claim 15, including the step of placing said first and second laminae into contact along said bonding interface prior to impregnating said first laminae with said adhesive composition.

21. A method according to claim 20, said second laminae being liquid pregnable, said method including the step of impregnating said first and second laminae with said adhesive composition after placing said first and second laminae into contact along said bonding interface.

22. A method according to claim 15, including the steps of impregnating said first laminae with said adhesive, and subsequently placing said first laminae into contact with said second laminae.

23. A method according to claim 22, further, including the step of impregnating said second laminae with said adhesive.

24. A method according to claim 23, wherein said second laminae is impregnated prior to placing said second laminae into contact with said first laminae.

25. A method for preparing a prepreg, comprising the steps of:

providing a liquid pregnable substrate comprising a non-woven mat of glass fibers; and impregnating said substrate with an adhesive composition, said adhesive composition comprising corn hull hemicellulose and water, said hemicellulose being present in an amount of at least 45% by dry weight of said adhesive composition.

26. A method according to claim 25, said hemicellulose being present in an amount of at least 50% by dry weight of a bonding agent in the adhesive.

27. A method for preparing a laminate, comprising the steps of providing a first laminae and a second laminae, at least said first laminae comprising a non-woven mat of glass fibers and being liquid pregnable and being impregnated with a liquid adhesive composition, said adhesive composition comprising corn hull hemicellulose and water, the hemicellulose being present in an amount of at least 45% by dry weight of a bonding agent in the adhesive composition, said first laminae being in contact with said second laminae along a bonding interface; and at least substantially dewatering said adhesive to thereby form an adhesive bond between said first laminae and said second laminae at said bonding interface.

28. A method according to claim 27, wherein said adhesive composition comprises a liquid fraction derived from an alkaline cooked corn hull residue.

29. A method according to claim 27, said dewatering step including applying heat.

30. A method according to claim 27, including the stops of impregnating said first laminae with said adhesive, and subsequently placing said first laminae into contact with said second laminae.

31. A method according to claim 27, said hemicellulose being precut in an amount of at least 50% by dry weighs of the bonding agent in the adhesive.

* * * * *

UNITED STATES PATENT AND TRADEMARK OFFICE
CERTIFICATE OF CORRECTION

PATENT NO. : 6,805,764 B2
DATED : October 19, 2004
INVENTOR(S) : J. Steve Taylor et al.

It is certified that error appears in the above-identified patent and that said Letters Patent is hereby corrected as shown below:

Column 3,
Lines 52-53, please replace "The remainder of the bonding agents, if any, in the adhesive composition may be starch-based." with -- The remainder of the bonding agents, if any, in the adhesive composition may be starch-based bonding agents, synthetic bonding agents, or other bonding agents as may be known or found suitable for use. --.

Column 11,
Line 3, please replace "composition" with -- composition, --.

Column 12,
Line 59, please replace "stops" with -- steps --.
Line 64, please replace "precut" with -- present -- and "weighs" with -- weight --.

Signed and Sealed this

Sixth Day of December, 2005

JON W. DUDAS
*Director of the United States Patent and Trademark Office*